Jan. 26, 1954   E. M. STANKEWICH   2,666,949
MOLDING MACHINE
Filed Sept. 27, 1950   3 Sheets-Sheet 2
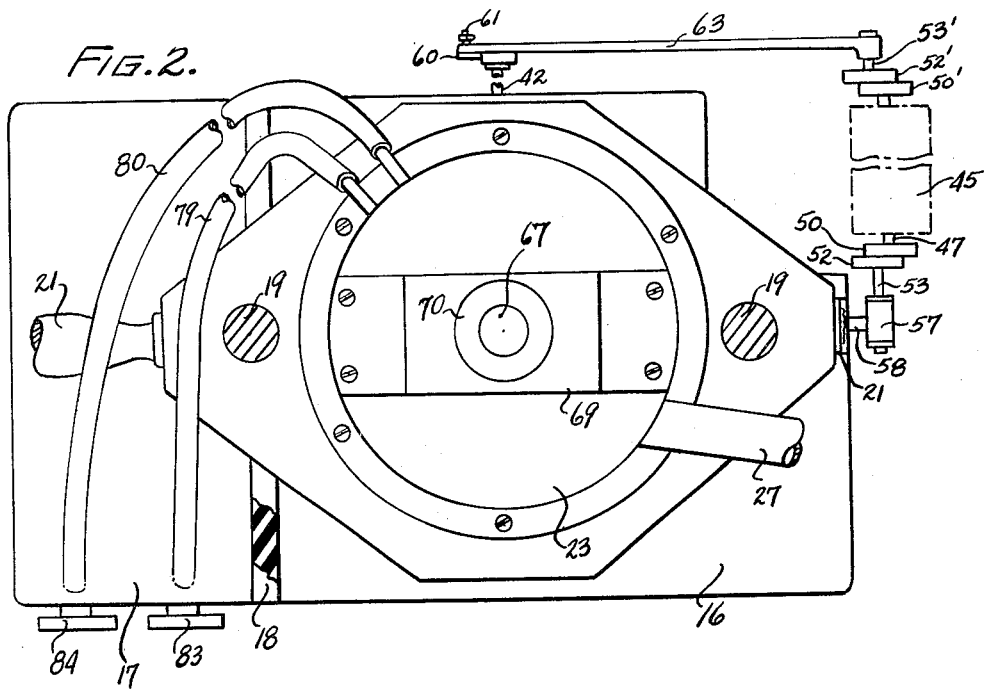
FIG. 2.
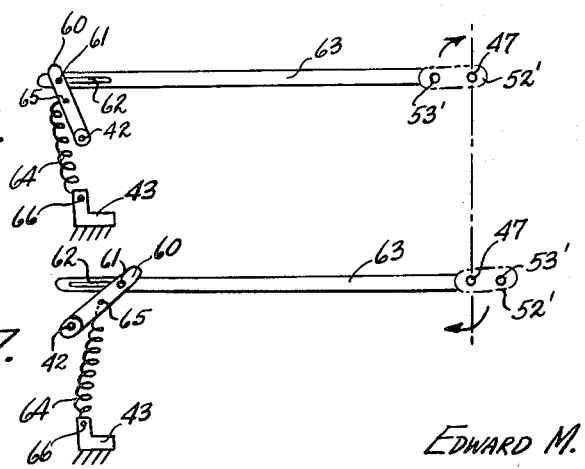
FIG. 6.
FIG. 7.
EDWARD M. STANKEWICH,
INVENTOR.
BY 
ATTORNEY Jan. 26, 1954     E. M. STANKEWICH     2,666,949
MOLDING MACHINE
Filed Sept. 27, 1950     3 Sheets-Sheet 3
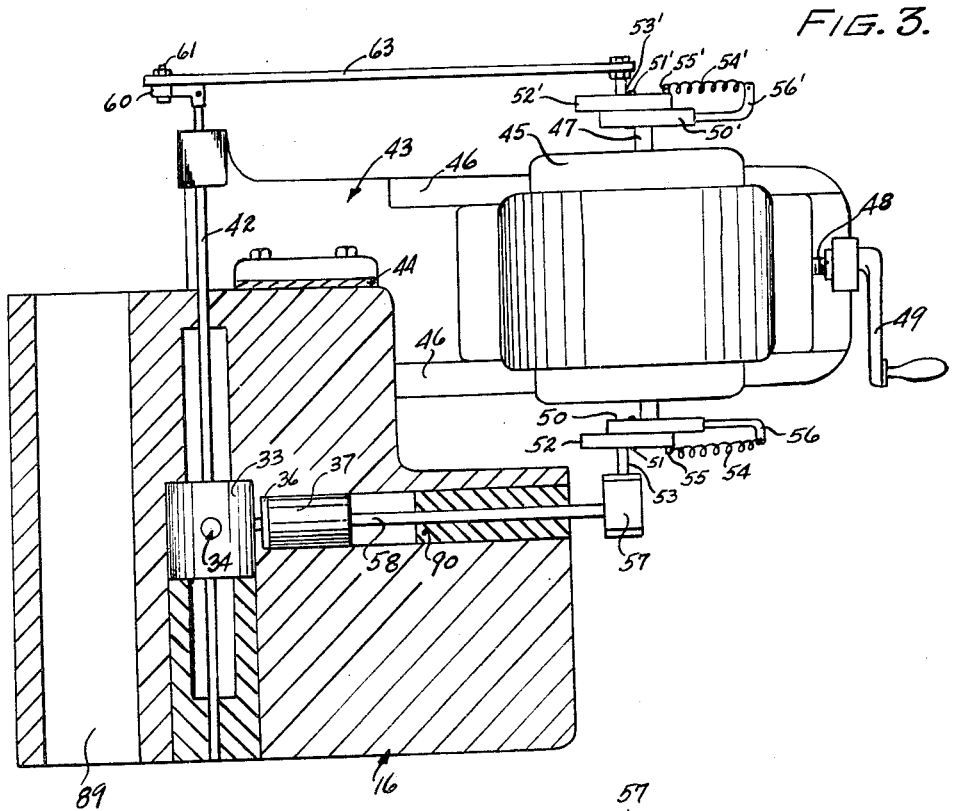
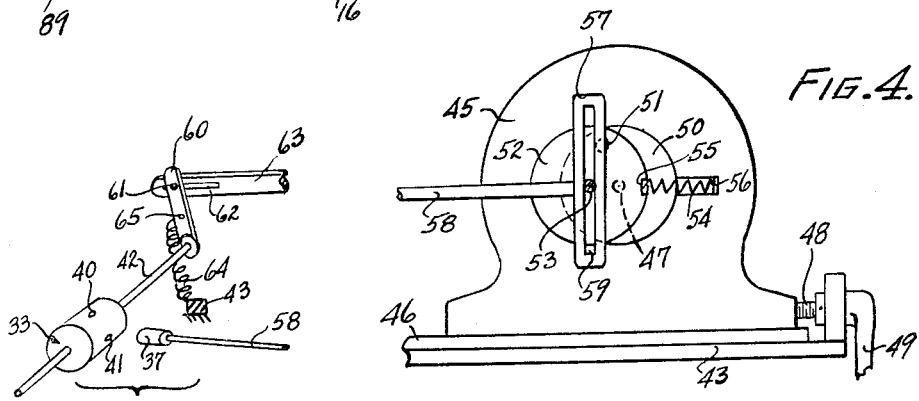
EDWARD M. STANKEWICH,
INVENTOR.
BY
ATTORNEY Patented Jan. 26, 1954

2,666,949

UNITED STATES PATENT OFFICE 2,666,949

MOLDING MACHINE

Edward M. Stankewich, South Ozone Park, N. Y.

Application September 27, 1950, Serial No. 186,944

7 Claims. (Cl. 18—5.7)

The present invention relates to novel molding machines and more particularly to a type suitable for molding plastic dentures and a variety of other articles of various materials.

An object of this invention is to provide a novel and improved molding machine which not only brings molten substance into the mold, but also assures that the mold cavity is packed full with such substance to accomplish a precision cast piece free of voids.

Another object hereof is to provide a novel and improved molding machine of the character mentioned, having a new mode of operation and avoiding oxidation of the molten material, so that it is possible to use a substance such as nylon for molding of dentures which is here given as a particular example. Of course, the machine may be used for the molding of other articles of various materials as practiced in the molding art generally.

A further object of this invention is to provide a molding machine of the nature set forth, of novel and improved construction, which is simple to operate, reasonable in cost to manufacture and efficient in carrying out the purposes for which it is designed.

Other objects and advantages will become apparent as this disclosure proceeds.

To attain these objects, I have devised the present machine which utilizes my novel process and constructional features whereby the molten substance to fill the mold is kept free from the atmosphere, is drawn into the mold cavity by the action of vacuum, and then by the use of pressure upon an excess of molten material and upon that already in the mold cavity, I accomplish full packing of the mold cavity. As a component of the machine I have a pump means adaptable to be set to work as a vacuum pump and then when required, as a sort of force pump, as will be fully set forth, together with whole machine structure and its mode of operation.

In the accompanying drawings forming part of this specification, similar characters of reference indicate coresponding parts in all the views.

Fig. 2 is a section taken at lines 2—2 in Fig. 1.

Fig. 3 is a section taken at lines 3—3 in Fig. 1.

Fig. 4 is a fragmentary front view of the motor included in Fig. 3, and associated components.

Fig. 5 is a fragmentary perspective view showing pump, barrel valve and associated parts included in the machine.

Figs. 6 and 7 show valve actuating mechanism in various positions during operation.

Figure 1:
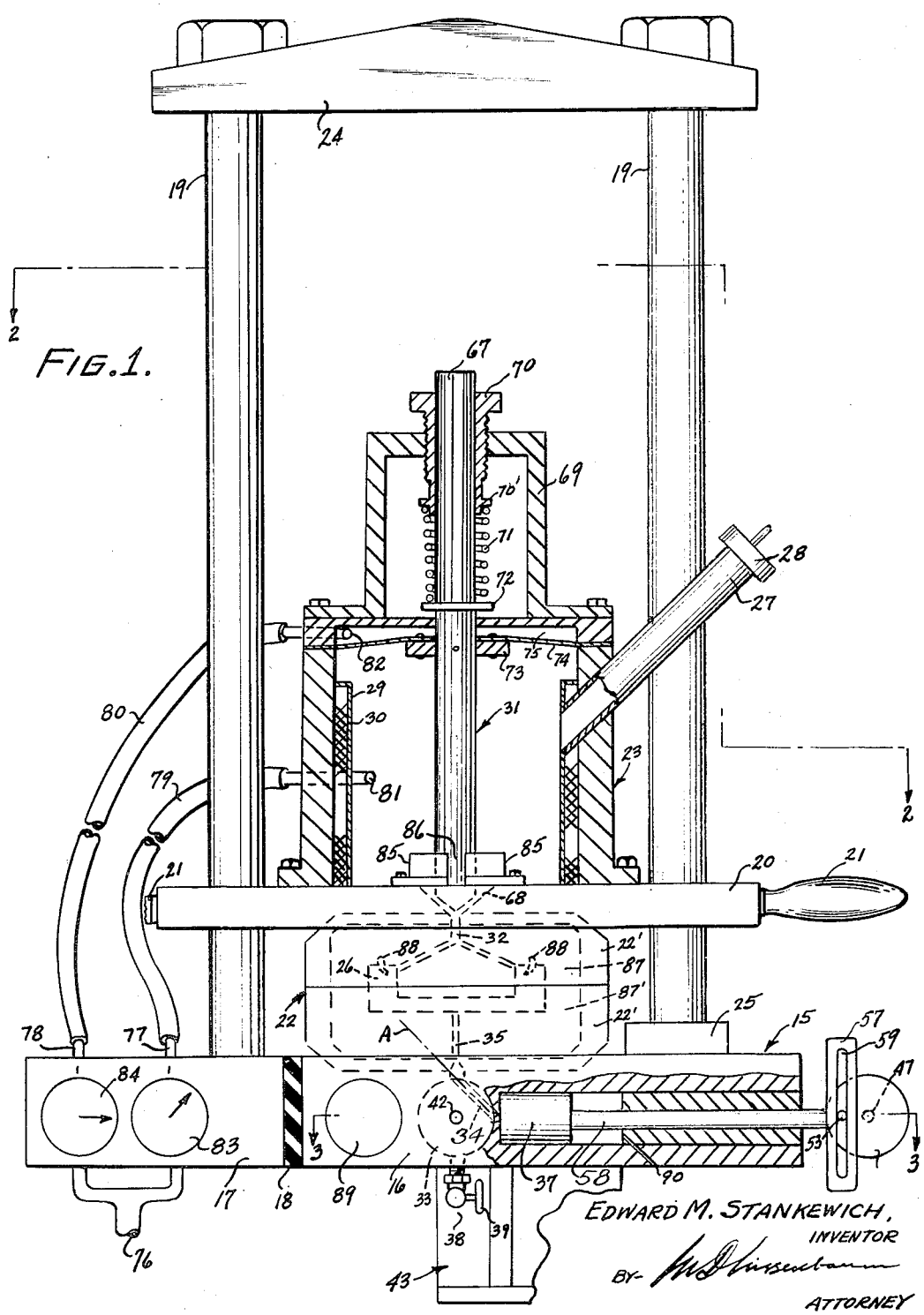
Fig. 1 is a front view of a machine embodying the teachings of this invention. This view is shown partly in section.

In the drawings, the numeral 15 designates generally a base shown composed of the metal sections 16 and 17, assembled in any suitable manner with a heat-insulative piece 18 between them. A pair of fixed spaced rods 19 extend upwardly from the base, to serve as track means for a plate member 20, slidably mounted on said rods. This plate member may be provided with handles 21 so that it may be slid along said rods, to hold or make accessible for removal of a dental flask or other mold structure denoted generally by the numeral 22, fitted between the base section 16 and said plate member 20, in suitable recesses as shown. Atop the plate member 20, is a melting chamber 23, which is positioned between the rods 19. The top ends of said rods are joined to a cross piece 24. The socket 25 is of heat-insulative material, in which the bottom end of the rod extending from the base section 16, is fixed. Material to be plasticized or melted and then cast in the cavity 26 of the mold 22, is admitted into the chamber 23, through a chute tube 27 provided with a covering cap 28. The numeral 29 denotes a jacket in which suitable electrical heating coils 30 are housed.

The numeral 31 designates generally a plunger valve to control the flow of molten material from the melting chamber 23 into the mold 22 through the upper gate 32. The numeral 33 denotes generally a barrel valve, whose duct 34, when in the position shown along line A, connects the lower gate 35 of the mold cavity with the cylinder 36 of a pump whose piston is 37, while when at its other limit position, said duct 34 connects said pump cylinder 36 with an outlet 38 controlled by the hand valve 39. The ends of said duct are indicated at 40 and 41, which in the embodiment shown, are ninety degrees apart on the peripheral surface of the barrel valve 33. Said barrel is on a shaft 42.

A framework 43, depending from the rear edge of the base section 16, and heat-insulated therefrom by member 44, supports an electric motor 45 which is slidable thereon between the track members 46. The motor shaft 47 is parallel to the barrel valve shaft 42. A screw 48, journalled on the frame work 43, threadedly engages the motor frame and is equipped with a crank handle 49, which when turned, will shift the motor 45 towards or away from the shaft 42. Each end of the motor shaft 47 carries a separate sheave or disc member 50 secured thereon. For convenience, one of these sheaves is denoted by the numeral 50'. On a pin 51', sheave 50' carries the swingably mounted sheave 52'. On a pin 51, sheave 50 carries the swingably mounted sheave 52. Extending centrally from the sheave 52' is the pin 53'. Extending centrally from the sheave 52 is the pin 53. A compression spring 54', with its ends mounted on the elements 55' and 56', holds the sheaves 50' and 52' in non-concentric relation. A compression spring 54, with its ends mounted on the elements 55 and 56, holds the sheaves 50 and 52 in non-concentric relation. All parts carried on the motor shaft 47 are so arranged that pins 51 and 51' are in alignment, and also that pins 53 and 53' are in alignment.

A bar 57, forming a T shape with the piston rod 58, has a longitudinal slot 59, through which the pin 53 extends; said pin being slidable along said slot. The shaft 42 carries a crank 60, whose pin 61 extends into and is free to slide in a slot 62 at an end of the connecting bar 63, whose other end is pivotally mounted on the pin 53'. One end of a stressed tension coil spring 64 is connected to the crank 60 at a point 65 which is intermediate the shaft 42 and the crank pin 61. The other end of this spring 64 is connected to the framepiece 43 at a point 66 such that when the barrel valve 33 is midway in its travel between its remote positions mentioned, the line of points 65 and 66, intersects the axis line of shaft 42.

The conical bottom end of the valve rod 67 of the plunger valve 31, normally rests on valve seat 68, cutting off thereby communication from the heating chamber 23 to the upper gate 32. The numeral 69 designates a bridge-piece mounted atop the heating chamber 23, for threadedly supporting a bushing 70 which serves as a bearing from the sliding movement of the valve rod 67. A stressed compression spring 71 about said rod, is positioned between and against the bushing's flange 70' and a collar 72 fixed on said rod 67. Near ceiling region interior chamber 23, said valve rod carries the fixed collar 73 which is attached to a thin springy metal plate 74 forming an hermetically sealed chamber 75. A vacuum pump not shown, is arranged to exhaust air from the chambers 23 and 75, by connection at 76, through the branches 77 and 78 respectively connected by suitable lengths of flexible tubing 79 and 80, to the openings 81 and 82 of said respective chambers. Control of vacuum action is accomplished by means of the hand-operated valves 83 and 84 interposed in said branches respectively. The numerals 85 indicate bearing members which are spaced as at 86, to permit molten substance to flow from the melting chamber 23 into the upper gate 32, when the valve 31 is in open condition as shown in Fig. 1.

It is to be noted that when the intensity of vacuum effected in chamber 75 exceeds that in chamber 23, the springy plate 74 will be flexed upward whereupon the valve 31 will be in open condition. Equalizing the degree of vacuum in both these chambers, will cause said valve 31 to close. Also to be noted is that action of piston 37 in cylinder 36 while the barrel valve 33 is permitted to oscillate, is that of a vacuum pump exhausting the mold cavity 26. During such pump operation, when the intensity of vacuum effected in the mold cavity 26, exceeds that in chamber 23, and whereupon the valve 31 is open, molten substance from the chamber 23 will be forcibly drawn into the mold cavity.

It is evident that the position of the motor 45 determines the distance between the motor shaft 47 and the pin 53, and hence the length of stroke of the piston 37. Said motor is initially positioned by manipulation of handle 49, to permit said piston 37 its longest stroke, measured as twice the distance the axes of the motor shaft 47 and the pin 53. The spring 54 is of sufficient stiffness to maintain any desired amount of overlapping of the sheaves it is associated with. While the motor is operating, manipulation of handle 49 to shift the motor towards the left in Fig. 3, will cause the motor shaft to come into axial alignment with the pins 53 and 53', whereupon piston 37, for its very last movement will halt at the cylinder end nearest the barrel valve 33, because the piston rod 58 is moved towards the left. Also, simultaneously, because the connecting member 63 is moved towards the left, the barrel valve 33 will halt with its duct 34 in position along line A.

The flask 22 may be of two dished halves 22' and 22'', provided respectively with the upper gate 32 and the lower gate 35, and held detachably together in any suitable fashion known in the art after impressions are made in plaster of Paris fills 87 and 87' to form the mold cavity 26, which if for a dental plate for instance, may have teeth 88 inset, as is well known in the dental art. The casting of a dental plate is taken as an example, because this machine is adapted for making the plate of nylon. As mentioned, nylon need be worked to the exclusion of air in order to avoid oxidation. Since vacuum may be attained in both the melting chamber 23 and in the mold cavity 26, the prescribed condition is accomplished. If the nature of the substance worked with needs no assurance against oxidation, valve 83 is left closed and the chute tube 27 may be left open during casting operation. In the statement of operation now to be given, use of nylon as the casting material is assumed. Also I shall assume that the mold structure is in condition to be set in the machine as shown in Fig. 1.

To set the machine for operation, plate 20 is raised and the mould structure 22 is set in its receiving recess atop the base section 16. Said plate is now lowered to set on the mold structure; receiving the top of same in a suitable recess provided for such purpose in the underside of said plate 20. Electric current is supplied to the heater coil 89 imbedded in the base section 16, so that molten substance issuing from the heating chamber 23, into the flask 22, from which some will come through the barrel valve 33 and into the cylinder 36, shall remain fluid. The vacuum pump connected to 76 is actuated. Valves 83 and 84 are closed. Valve 39 is opened slightly. The plunger valve 31 is in closed condition. Heater coils 30 are supplied with electric current. A sufficient quantity of nylon pellets or granules are thrown into the melting chamber 23 through the chute tube 27 and said chamber hermetically sealed upon mounting the cap 28.

Handle 49 is now turned to shift the motor 45 to its position along tracks 46, so that the distance between the axes of the motor shaft 47 and the pin 53 is such that the barrel valve 33 will oscillate whereby its duct 34, at the limits of movement will be at the position shown in Fig. 1 along line A and at the position where said duct connects passage 35 with the cylinder 36, respectively. The assembly illustrated is such, that when piston 37 is at the cylinder end nearest the barrel valve 33, the duct 34 of said valve will be along line A.

Motor 45 is now actuated and let run continuously. Valve 83 is opened to create vacuum in the melting chamber. Rotation of motor 45 will cause the barrel valve 33 to oscillate and the piston 37 to reciprocate. During travel of said piston to the right in Fig. 1, the air from the mold cavity 26 will be withdrawn through duct 34 at position A and thence into the cylinder 36. Air in the said cylinder behind the piston, is expelled by piston movement through the hole 90. Upon return movement of the piston 37, the valve duct 34 is in position connecting the cylinder 36 with the drip pipe 38, and hence any air in front of the piston, will be expelled through 38. It is therefore apparent that molten substance whether within the melting chamber 23 or within the mold cavity 26, or in the duct 34 while the barrel valve is at position A, or if drawn into the cylinder 36, is always free from the influence of air, eliminating the possibility of any oxidation to occur.

After proper lapse of time to permit the nylon substance to melt, valve 84 is operated to create a greater degree of vacuum in chamber 75 than exists in the melding chamber 23, whereupon valve rod will be lifted due to the upward flexing of the diaphragm 74, to open the plunger valve 31. Molten substance will be drawn into the mold cavity 26 from the melting chamber 23, by the vacuum action effected by operation of the piston 37; operation being such that the degree of vacuum existing in the said cavity exceeds that existing in the melting chamber. As the mold cavity fills, some of the nylon substance will be drawn into the cylinder 36, and depending upon duct position, will be forced back into the mold cavity 26, or forced out through the drip at 38. After suitable lapse of time for the entire mold cavity to be filled, valve 84 is closed, valve 83 is opened fully, whereupon plunger valve 31 closes, and simultaneously with these manipulations or nearly so, handle 49 is turned to shift the motor 45 to a position where its shaft 47 is in axial alignment with the pins 53 and 53', whereupon piston 37 coming to end of cylinder 36, nearest the barrel valve 33 whose duct 34 is now along position of line A, acts as a force pump and forces molten substance from cylinder 36 to pack the mold cavity 26 and thus insure a precision casting. The action of the piston 37 is to feed molten substance into the mold cavity by drawing it therein by vacuum, and then packing the mold cavity by pressure. Immediately before or after the mentioned manual operations, the current supply is cut off to the heating coils 30 and 89, and to the motor 45. After all heated parts have cooled sufficiently, the flask 22 is removed, and the finished casting taken from the mold.

It is advisable that the barrel valve 33, shall move from one to the other of its limit positions, faster than would be accomplished by movement of its controlling crank pin 53'. Referring to Figs. 6 and 7, it is to be noted that in each direction of movement of the connecting arm 63, as soon as the member 60 is shifted beyond the position where points 65, 42 and 66 are in alignment, the stressed spring 64 will hasten movement of said member 60 to the limit position it is approaching, as is permitted by the slot 62. This means to hasten movement is well known, and therefore requires no further explanation as it is well understood by those versed in the machine art.

Other plastics or metals may be used for casting articles of all kinds with this machine. The valve 31 may be manually operated or in any other suitable manner other than by vacuum action. Means known in the art of machine construction may be used for raising, lowering and securing the plate 20.

This invention is capable of various forms and applications without departing from the essential features herein disclosed. It is therefore intended and desired that the embodiment illustrated shall be deemed illustrative and not restrictive, and that the patent shall cover all patentable novelty herein set forth; reference being had to the following claims rather than to the specific description herein, to indicate the scope of this invention.

I claim:

1. In a molding machine of the character described, the combination of a melting chamber, a mold having a mold cavity with an entrance passage thereto and an exit passage therefrom; said entrance passage being communicative with the melting chamber to receive molten substance therefrom, a valve for controlling the flow of molten material from the melting chamber into said entrance passage, a cylinder having a piston movable therein, a valve means comprising a stator member having three ports; the first being communicative with the exit passage from the mold cavity, the second being communicative with the cylinder and the third being a discharge orifice, and a movable valve member carried by the stator member; said movable valve member having a duct which at a first position of the movable valve member, connects the first and second ports of the valve stator, and at a second position of the movable valve member, connects the second and third ports of the valve stator, means to oscillate the movable valve member from one of said positions to the other, a means to reciprocate the piston within the cylinder, whereby said piston is at the second port every time the movable valve member is at the said first position, and away from said second port every time the movable valve member is at said second position and operator-controlled means to halt the movable valve member at said first position.

2. A machine as defined in claim 1, including means to accelerate movement of the movable valve member from its respective positions after each commencement of a reversal of movement of the piston within the cylinder.

3. A machine as defined in claim 1, including means to heat the piston, cylinder, valve stator, movable valve member and the mold.

4. A machine as defined in claim 1, wherein the cylinder and the valve stator member serve as a base to support the mold.

5. A machine as defined in claim 4, including a base adapted to support a mold, provided with a duct connecting the exit passage of the mold cavity with the first port in the valve stator when the mold is set on the base, and including a plate member adapted to be set atop the mold; the melting chamber being mounted atop said plate; said plate having an opening therethrough, communicative with the entrance passage to the mold cavity and the melting chamber; the valve controlling the flow of molten substance from said melting chamber into the entrance passage to the mold cavity, including a slidably mounted rod, normally closing the opening in the plate member, a springy membrane member secured to said rod, another chamber; said membrane closing both said other chamber and the melting chamber hermetically, and means to alter the pressure in said other chamber to operate said rod to control the flow of molten substance from the melting chamber into the mold cavity.

6. A machine as defined in claim 5, including means to alter the pressure within the melting chamber.

7. A machine as defined in claim 6, wherein each of the means for altering the pressure establishes a vacuum condition.

EDWARD M. STANKEWICH.

References Cited in the file of this patent

UNITED STATES PATENTS

| Number | Name | Date |
|---|---|---|
| 791,648 | Richards | June 6, 1905 |
| 2,269,953 | Morin et al. | Jan. 13, 1942 |
| 2,359,013 | Tucker | Sept. 26, 1944 |
| 2,501,329 | Hall | Mar. 21, 1950 |